(12) United States Patent
Li et al.

(10) Patent No.: US 12,175,316 B2
(45) Date of Patent: Dec. 24, 2024

(54) INFORMATION MANAGEMENT METHOD, DEVICE, SYSTEM AND MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shuo Li, Beijing (CN); Junpeng Han, Beijing (CN); Jinmiao Tang, Beijing (CN); Yanjun Liu, Beijing (CN); Qingqing Ma, Beijing (CN); Yinan Gao, Beijing (CN); Yin Yuan, Beijing (CN); Tianjiao Wang, Beijing (CN); Hui Sun, Beijing (CN); Yonggang Xie, Beijing (CN); Guangquan Wang, Beijing (CN); Liguang Deng, Beijing (CN); Zixi Qi, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/770,516

(22) PCT Filed: Jun. 18, 2021

(86) PCT No.: PCT/CN2021/101060
§ 371 (c)(1),
(2) Date: Apr. 20, 2022

(87) PCT Pub. No.: WO2022/261974
PCT Pub. Date: Dec. 22, 2022

(65) Prior Publication Data
US 2024/0152719 A1 May 9, 2024

(51) Int. Cl.
*G06K 19/077* (2006.01)
(52) U.S. Cl.
CPC .............. *G06K 19/07707* (2013.01)
(58) Field of Classification Search
CPC ... G07C 9/29; G07C 9/27; G07C 9/25; G07C 9/00; G06K 19/07707; G06K 19/0707;
(Continued)

(56) References Cited

U.S. PATENT DOCUMENTS

| 6,910,628 B1* | 6/2005 | Sehr | G06Q 20/045 |
| | | | 705/5 |
| 10,037,637 B1* | 7/2018 | Yamada | G07C 9/253 |

(Continued)

FOREIGN PATENT DOCUMENTS

| CN | 102592157 A | 7/2012 |
| CN | 204256763 U | 4/2015 |

(Continued)

*Primary Examiner* — Daniel I Walsh
(74) *Attorney, Agent, or Firm* — WHDA, LLP

(57) ABSTRACT

An information management method, a device, a system and a medium. The information management method applied to a first terminal, including: sending an information acquisition request to a server, so that the server responds to the information acquisition request and sends visitor information to the first terminal; receiving the visitor information sent by the server; generating card information according to the visitor information; and sending the card information to an electronic card, so that the electronic card displays the card information.

15 Claims, 9 Drawing Sheets

(58) Field of Classification Search
CPC .......... G06K 19/0718; G06F 2212/177; G06F 15/0241
See application file for complete search history.

(56) References Cited

U.S. PATENT DOCUMENTS

| | | | | |
|---|---|---|---|---|
| 11,308,747 | B1* | 4/2022 | Sahani | G07C 9/28 |
| 11,769,360 | B1* | 9/2023 | Kelly | G07C 9/22 |
| | | | | 340/5.61 |
| 11,823,512 | B1* | 11/2023 | Nguyen | G07C 9/00571 |
| 2001/0041994 | A1* | 11/2001 | Kim | G06Q 10/02 |
| | | | | 705/5 |
| 2002/0013738 | A1* | 1/2002 | Vistisen | G06Q 30/02 |
| | | | | 705/26.1 |
| 2004/0099731 | A1* | 5/2004 | Olenick | G07F 17/26 |
| | | | | 235/380 |
| 2006/0202038 | A1* | 9/2006 | Wang | G06K 7/10732 |
| | | | | 235/462.24 |
| 2010/0093401 | A1* | 4/2010 | Moran | H02J 7/342 |
| | | | | 455/566 |
| 2010/0165389 | A1* | 7/2010 | Kido | G07C 11/00 |
| | | | | 358/1.15 |
| 2012/0300252 | A1* | 11/2012 | Nagata | G06F 21/6218 |
| | | | | 358/1.15 |
| 2013/0301886 | A1* | 11/2013 | Koda | G06F 21/32 |
| | | | | 382/118 |
| 2014/0006277 | A1* | 1/2014 | Rao | G06Q 20/3572 |
| | | | | 705/41 |
| 2017/0286812 | A1* | 10/2017 | Kukita | H04N 1/6094 |
| 2019/0295195 | A1* | 9/2019 | Roosli | G06Q 10/02 |
| 2019/0318558 | A1* | 10/2019 | Biehlmann | G07C 9/27 |
| 2021/0136252 | A1* | 5/2021 | Fukuda | H04N 1/32106 |
| 2022/0114514 | A1* | 4/2022 | Perkins | H04B 17/318 |
| 2022/0318192 | A1* | 10/2022 | Chen | G06F 16/14 |
| 2023/0385714 | A1* | 11/2023 | Desai | G06Q 10/02 |
| 2023/0394125 | A1* | 12/2023 | Hirata | G06V 40/171 |
| 2024/0029493 | A1* | 1/2024 | Saito | H04M 9/00 |

FOREIGN PATENT DOCUMENTS

| | | |
|---|---|---|
| CN | 107958516 A | 4/2018 |
| CN | 108877691 A | 11/2018 |
| CN | 109300200 A | 2/2019 |
| CN | 109830004 A | 5/2019 |
| CN | 110349516 A | 10/2019 |
| CN | 111313938 A | 6/2020 |
| CN | 111326084 A | 6/2020 |
| IN | 106569790 A | 4/2017 |

* cited by examiner

FIG. 4

INFORMATION MANAGEMENT METHOD, DEVICE, SYSTEM AND MEDIUM

TECHNICAL FIELD

The present disclosure relates to the technical field of computer, and more particularly, to an information management method, a device, a system and a medium.

BACKGROUND

Information cards such as visitor cards are widely used in exhibitions or customer visits and other scenes which play a role of identity recognition. However, most of the existing information cards are printed plastic cards or paper cards, and it is not convenient for unified management and replacement for such traditional information cards.

SUMMARY

The present disclosure provides an information management method, applied to a first terminal, including:
  sending an information acquisition request to a server, so that the server responds to the information acquisition request and sends visitor information to the first terminal;
  receiving the visitor information sent by the server;
  generating card information according to the visitor information; and
  sending the card information to an electronic card, so that the electronic card displays the card information.

In an optional embodiment, before the step of generating the card information according to the visitor information, the method further includes:
  determining template information, the template information includes a template field and format information corresponding to the template field;
  the step of generating the card information according to the visitor information includes:
  determining template content corresponding to the template field according to the visitor information; and
  generating card information according to the template field, the format information and the template content.

In an optional embodiment, the step of determining the template content corresponding to the template field according to the visitor information includes:
  acquiring a user input;
  determining target visitor information from the visitor information according to the user input, the target visitor information includes attribute content of at least one visitor attribute of a target visitor; and
  determining the template content corresponding to the template field according to the attribute content of the visitor attribute corresponding to the template field in the target visitor information.

In an optional embodiment, the template field includes a visitor photo field, the attribute content of the visitor attribute corresponding to the visitor photo field in the target visitor information is a network address of target visitor photo information on the server;
  the step of determining the template content corresponding to the template field according to the attribute content of the visitor attribute corresponding to the template field in the target visitor information includes:
  acquiring target visitor photo information from the server according to the network address, and determining the template content including the target visitor photo information;
  the step of generating the card information according to the template field, the format information and the template content includes:
  processing the target visitor photo information according to the format information corresponding to the visitor photo field to obtain image information to be displayed, and to generate the card information including the image information to be displayed.

In an optional embodiment, the step of processing the target visitor photo information includes at least one of the following steps:
  adjusting a size of the target visitor photo information; and
  halftone processing the target visitor photo information.

In an optional embodiment, the step of determining the template information includes:
  acquiring a template identification input by the user;
  acquiring the template information stored in advance in the first terminal corresponding to the template identification.

In an optional embodiment, the step of sending the card information to an electronic card includes:
  sending the card information to a card reader connected to the first terminal, so that the card reader sends the card information to the electronic card through near-field communication.

The present disclosure provides an information management method, applied to a server, including:
  receiving an information acquisition request sent by a first terminal;
  determining visitor information, in response to the information acquisition request;
  sending the visitor information to the first terminal;
  wherein, the first terminal is configured to generate card information according to the visitor information, and sends the card information to an electronic card so that the electronic card displays the card information.

In an optional embodiment, before the step of determining the visitor information, the method further includes:
  receiving an authentication request sent by a second terminal, the authentication request includes identification information of a visitor and scene photo information obtained by a scene photographing of the visitor, wherein the identification information includes identification identity information and identification photo information;
  determining reserved access information of the visitor;
  when the reserved access information is matched with the identification identity information, and the identification photo information is matched with a face recognition result of the scene photo information, and then an authentication status of the visitor is determined to be authenticated, the visitor information includes information of the authenticated visitor, the visitor information includes at least one of the following: identification identity information, identification photo information, reserved access information and scene photo information; and
  storing the visitor information.

In an optional embodiment, before the step of determining the reserved access information of the visitor, the method further includes:
  receiving an information filling request sent by a third terminal, the information filling request includes a visitor identification and an information template;
  sending the information template to a visitor terminal indicated by the visitor identification; wherein the visitor terminal is configured to receive and display the information template, obtain editing operation of the visitor for the information template, obtain the reserved access information of the visitor according to the editing operation, and send the reserved access information to the server; and receiving and storing the reserved access information.

In an optional embodiment, the information acquisition request includes a quantity identification, the quantity identification is configured to indicate a quantity of the visitor information request acquired by the first terminal;

the step of determining the visitor information, in response to the information acquisition request includes:

determining the visitor information according to the quantity of the visitor information indicated by the quantity identification.

The present disclosure provides an information management device applied to a first terminal, wherein, including a processor and a memory coupled with the processor, the memory stores a computer instruction, when the computer instruction is executed by the processor, the device executes the method according to any one of the embodiments.

The present disclosure provides an information management device applied to a server, wherein, including a processor and a memory coupled with the processor, the memory stores a computer instruction, when the computer instruction is executed by the processor, the device executes the method according to any one of the embodiments.

The present disclosure provides a non-transient computer readable storage medium, wherein, when instructions in the non-transient computer readable storage medium are executed by a processor of an electronic apparatus, electronic apparatus is capable of executing the method according to any one of the embodiments.

The present disclosure provides an information management system, including a first terminal, a server and an electronic card;

the first terminal, configured for sending an information acquisition request to the server; receiving the visitor information sent by the server; generating card information according to the visitor information; and sending the card information to the electronic card;

the server, configured for receiving the information acquisition request sent by the first terminal; determining visitor information, in response to the information acquisition request; and sending the visitor information to the first terminal; and the electronic card, configured for receiving the card information sent by the first terminal and displaying the card information.

In an optional embodiment, the information management system further includes:

a second terminal, configured for acquiring identification information of a visitor and scene photo information obtained by a scene photographing of the visitor, the identification information includes identification identity information and identification photo information; sending an authentication request to the server, the authentication request includes the identification information of the visitor and the scene photo information;

the server is further configured for receiving the authentication request sent by the second terminal; determining reserved access information of the visitor; if the reserved access information is matched with the identification identity information, and the identification photo information is matched with a face recognition result of the scene photo information, and then an authentication status of the visitor is determined to be authenticated, the visitor information includes information of the visitor whose authentication status is authenticated, the visitor information includes at least one of the following: identification identity information, storing the visitor information.

In an optional embodiment, the information management system further includes:

a card reader, connected with the first terminal, and configured for receiving the card information sent by the first terminal, and sending the card information to the electronic card through near-field communication, the near-field communication is Bluetooth communication, WIFI communication or NFC communication.

In an optional embodiment, the card reader is connected with the first terminal through a universal serial bus interface, and the card reader includes a first controller, a first near-field communication coil, a first near-field communication chip and a first power manager;

wherein, the first controller which is connected with the universal serial bus interface, the first power manager and the first near-field communication chip, is configured for controlling the reader to receive the card information sent by the first terminal through the universal serial bus interface, and sending the card information to the electronic card through the first near-field communication coil and the first near-field communication chip; and the first power manager which is further connected with the universal serial bus interface and the first near-field communication chip, is configured for supplying power to the first controller and the first near-field communication chip according to an output of the universal serial bus interface.

In an optional embodiment, the first terminal is a mobile terminal with near-field communication function, and the near-field communication is Bluetooth communication, WIFI communication or NFC communication.

In an optional embodiment, the electronic card includes a second near-field communication coil, a second near-field communication chip, a selector, a second power manager, a second controller and a display module;

the second near-field communication coil is configured for detecting a magnetic field signal;

the second near-field communication chip, which is connected with the second near-field communication coil and the selector, is configured for converting the magnetic field signal detected by the second near-field communication coil into an electrical signal when the magnetic field signal is detected by the second near-field communication coil, and outputting the electrical signal to the selector;

the selector which is further connected with the second controller and the second power manager, is configured for outputting an enabling signal to the second power manager according to the electrical signal and a working signal of the second controller; and the second power manager which is further connected with a power, the second controller and the display module, is configured to turn on or turn off the connection between the power and the second controller and the display module according to the enabling signal; and the second controller is configured to control the electronic card to receive the card information and refresh the display module when the connection between the second controller and the power is turned on; the display module is configured to display the card information.

In an optional embodiment, the display module includes an electronic ink screen.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art may obtain other figures according to these figures without paying creative work. It should be noted that the ratios in the drawings are merely illustrative and do not represent actual ratios.

FIG. 4 shows a displaying method of access information on an operating interface provided by the embodiments of the present disclosure;

DETAILED DESCRIPTION OF THE EMBODIMENTS

In order to make the objects, the technical solutions, and the advantages of the embodiments of the present disclosure clearer, the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
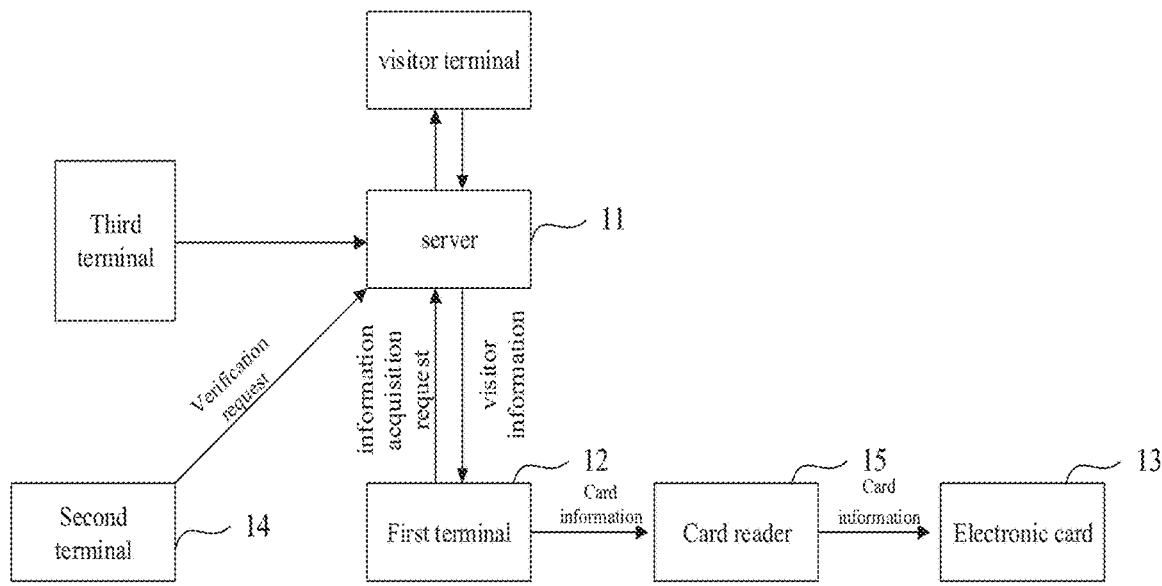
FIG. 1 shows a connection structure schematic diagram of an information management system provided by the embodiments of the present disclosure.

An embodiment of the present disclosure provides an information management system, referring to FIG. 1, the information management system may include a server 11, a first terminal 12 and an electronic card 13;

Wherein, the server 11 is configured to store visitor information, and send the visitor information to the first terminal 12. The first terminal 12 is configured to acquire the visitor information from the server 11, generate card information according to the visitor information, and send the card information to an electronic card 13. The electronic card 13 is configured to receive and display the card information. The information management system may be described in detail in the subsequent embodiments.

The information management system provided by the embodiment may be applied to exhibitions, visitor visits and other scenes requiring cards. It may conveniently manage and refresh display content on the electronic card 13, and has the advantages of convenient data processing, environmental conservation and saving. For example, on the first day of an exhibition, different participants may be issued corresponding cards, when another exhibition is held the next day, the display content on the electronic card 13 may be updated, and then issued to the participants of the next day, so that the electronic card may be used repeatedly.

An information management method provided by an embodiment applied to the first terminal 12 in the information management system (referring to FIG. 1). In the embodiment, the first terminal 12 may be an intelligent phone, a panel computer, or other intelligent device, which is not limited in the embodiment.

Figure 2:
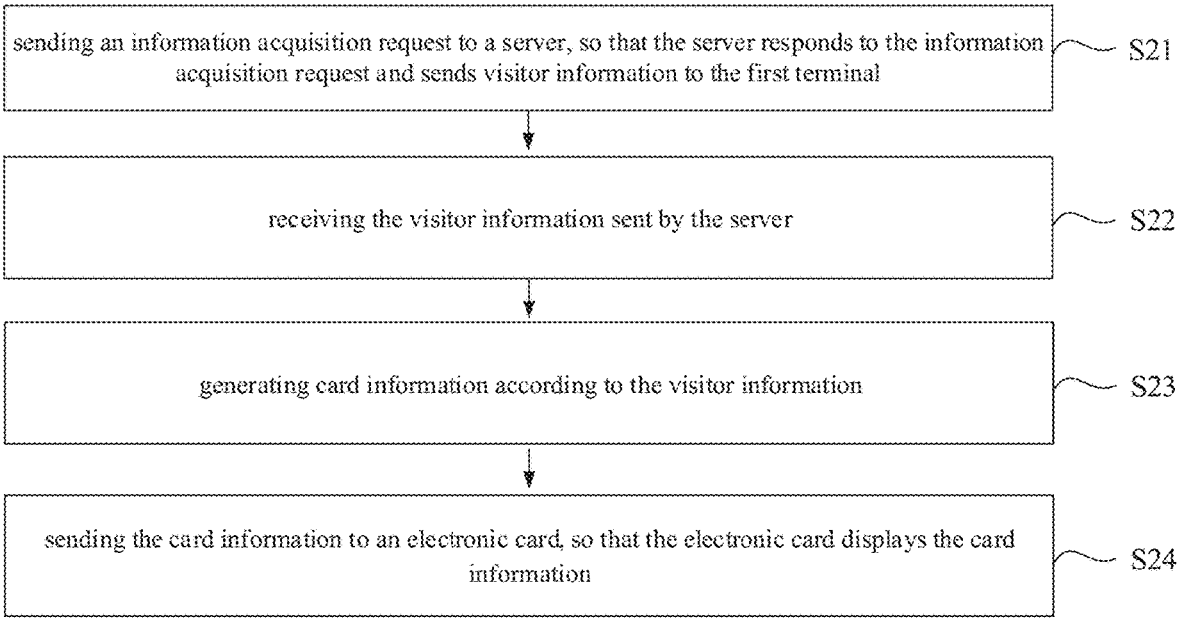
FIG. 2 shows a step flow chart of an information management method provided by the embodiments of the present disclosure.

Referring to FIG. 2, the information management method includes:

step S21: sending an information acquisition request to a server, so that the server responds to the information acquisition request and sends visitor information to the first terminal.

Wherein, the visitor information may be stored in a database of the server in advance. The first terminal may access the database according to database information (as shown in table 1 below), thus to acquire the visitor information.

TABLE 1

| | |
|---|---|
| Database type | SQL Server |
| Database server IP | 10.20.1xx.xx |
| Database name | DataName |
| Login account | logonName |
| Logging-in password | password |
| View name | visitorInfo |

Figure 3:
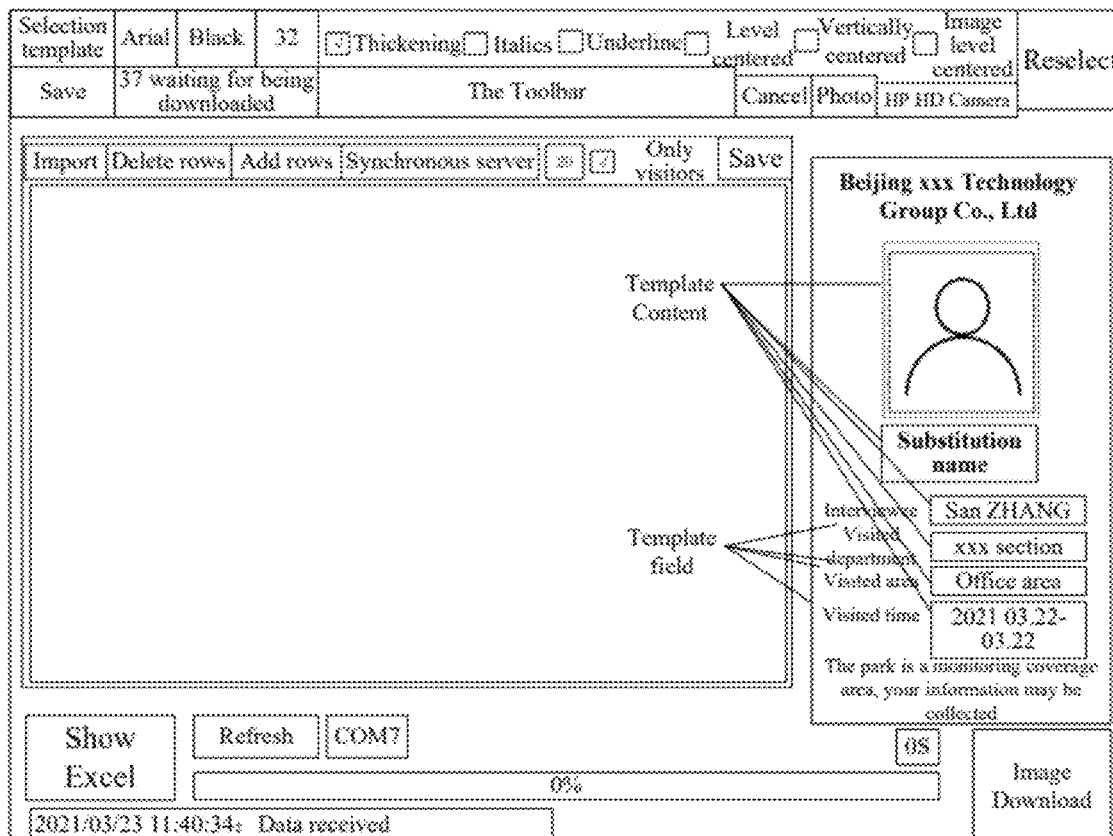
FIG. 3 shows two operating interfaces provided by the embodiments of the present disclosure.
Figure 3:
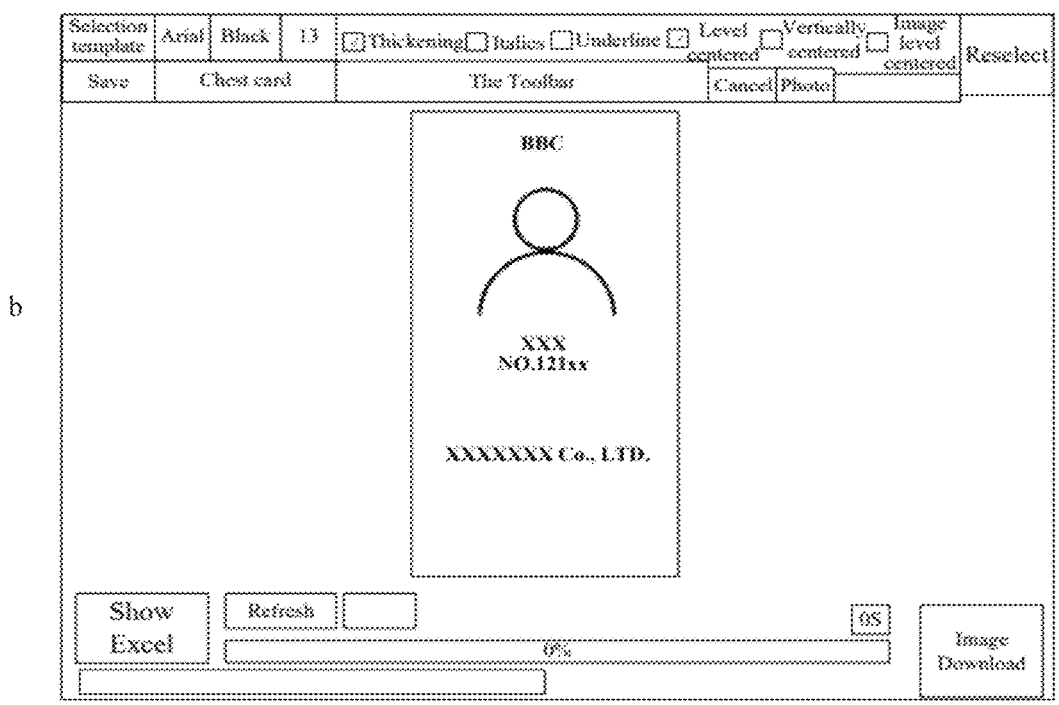

In a specific implementation, there are many ways for the first terminal to send the information acquisition request to the server. For example, when an operating interface for editing the card information may be opened on the first terminal (as shown in FIG. 3 *a* or *b*), the first terminal may send the information acquisition request to the server. The first terminal may also send the information acquisition request to the server when the user clicks on the operating control on the operating interface such as 'synchronous server' (as shown in FIG. 3). Wherein, the information acquisition request is configured to request acquire the visitor information on the server.

The information acquisition request sent by the first terminal to the server may also carry a quantity identification, the quantity identification is configured to indicate a quantity of the visitor information request acquired by the first terminal from the server. For example, the user may set the quantity identification as: all, 10, 20 and so on through a drop-down menu on the operating interface (as shown in FIG. 3a).

In practical applications, the first terminal may acquire an authorization of the server in advance. For example, Internet Protocol Address (IP address) of the first terminal may be added to an access a white list of the server in advance and so on. The server receives the information acquisition request sent by the first terminal, and may send the visitor information stored in the server in advance to the first terminal. In order to improve the security and the accuracy of the visitor information, the visitor information sent by the server to the first terminal may be the information of the verified visitor. Subsequent embodiments may describe the verification process in detail.

It should be noted that the visitor information stored in the server in advance may include the identification information collected by the second terminal (such as a visitor self-service machine) when the visitor visits, such as identification identity information and identification photo information acquired by the visitor self-service machine from the chip in the visitor identity card, and also include scene photo information obtained by a scene photographing of the visitor when the visitor visits by the second terminal; and also include reserved access information collected before the visitor visits by a third terminal (e.g. a visitor's mobile phone), the reserved access information may be identity information of the visitor input in advance by the visitors or interviewee. Subsequent embodiments may describe a detailed process of visitor information stored in the server in advance.

Step S22: receiving the visitor information sent by the server.

Figure 4:
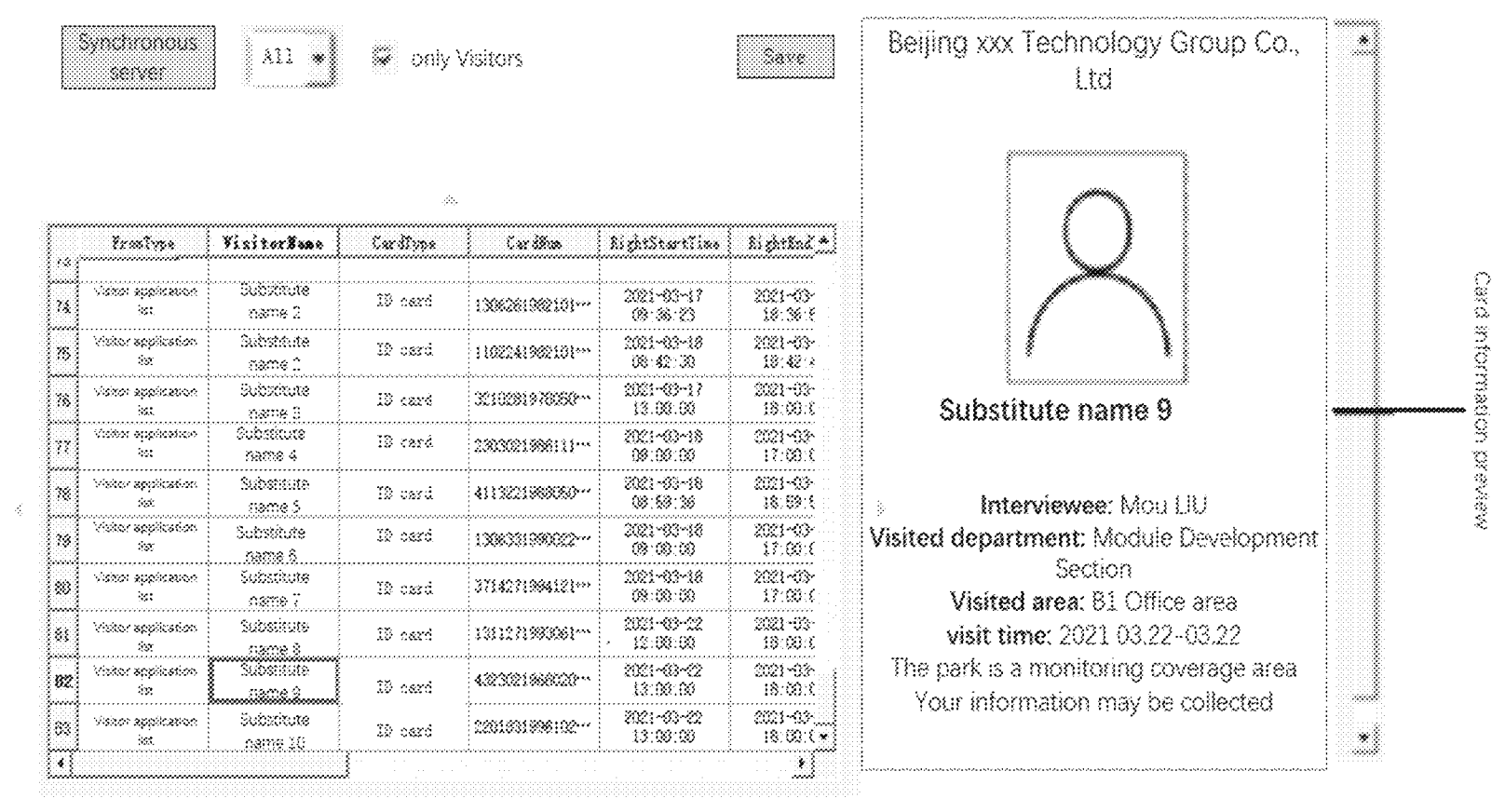

In a specific implementation, the first terminal receives the visitor information returned by the server, for example, the visitor information may be displayed in a form of a table on the operating interface of the first terminal, as shown in FIG. 4.

Step S23: generating card information according to the visitor information.

In a specific implementation, there are many ways for the first terminal to generate the card information according to the visitor information, for example, based on the operation of the user, the visitor information may be performed image processing and text editing and so on, the visitor photos and personal information (such as name, contact mode, company, etc.) in the visitor information may be synthesized to be a picture to generate card information, as shown in FIG. 3b. The first terminal may also obtain template information stored in the first terminal in advance first, and then match a template field in the template information with the visitor information to obtain template content corresponding to the template field, and then generate the card information according to the template field and template content, as shown in FIG. 3a. Subsequent embodiments may describe the latter in detail.

Step S24: sending the card information to an electronic card, so that the electronic card displays the card information.

In a specific implementation, there are many ways for the first terminal to send the card information to the electronic card in the information management system.

In an embodiment, as shown in FIG. 1, the information management system may also include a card reader 15, the card reader 15 is connected with the first terminal 12. The card reader 15 is configured for receiving the card information sent by the first terminal 12, and sending the card information to the electronic card 13 through near-field communication. Wherein the first terminal may be intelligent terminals such as personal computers. The first terminal may be connected with the card reader 15 through Universal Serial Bus (USB) interface.

In the embodiment, the first terminal may send the card information to the card reader first, so that the card reader 15 may send the card information to the electronic card 13 by wireless means such as near-field communication. Wherein the near-field communication is Bluetooth communication, WIFI communication or NFC communication.

Specifically, the first terminal may send the card information to the image processing module of the card reader through the USB interface, and then the card information is sent to the NFC wireless receiving module of the electronic card by the NFC wireless transmitting module of the card reader. Finally, the card information is refreshed and displayed on an electronic ink screen through the image processing module of the electronic card.

In another embodiment, the first terminal may be a mobile terminal with near-field communication function, for example a mobile phone with NFC function and so on. In the embodiment, the first terminal may directly send the card information to the electronic card by wireless means such as near-field communication and so on. Wherein, the near-field communication may be Bluetooth communication, WIFI communication or NFC communication.

In another embodiment, the first terminal may be intelligent terminals such as personal computers, the first terminal may be wired connected to the electronic card, for example through the Type-C interface, so that the first terminal may directly send the card information to the electronic card by a wired mode.

In the embodiment, the electronic card is configured to display the card information. The electronic card may be provided with the electronic ink screen and other display screens, which may easily replace the card information and may be used repeatedly for many times.

The information management method provided by the embodiment, the first terminal acquires the visitor information from the server, and then generates the card information according to the visitor information, and sends the card information to the electronic card to realize the refresh of the display content of the electronic card. The embodiment may conveniently manage and replace the card information on the electronic card, avoiding the trouble of inputting the visitor information (such as a scene photography, inputting personal information, etc.) on the scene in the related art.

In an optional embodiment, before the step S23, the first terminal may also execute the following steps: determining template information. Wherein, the template information includes the template field and the format information corresponding to the template field.

As shown in FIG. 3a, the template information may include the template fields such as visitor names, the interviewee, the visited departments, the visited area, visit time and visitor photos and so on. The template content corresponding to the template field may be obtained from the visitor information (as shown in the table in FIG. 4).

Template information may also include format information, such as font, color, size, location and so on, corresponding to the template field, so that the template content corresponding to the template field may be displayed according to the corresponding format information.

The number of the template fields in the template information may be one or more. Each template field may correspond to the same or different format information.

In the specific implementation, there are many ways to determine the template information.

In an optional embodiment, the template information may be stored in the database of the first terminal in advance. The steps of determining the template information may include: automatically reading the template information in the database and obtain default template information when the operation interface shown in FIG. 3a is turned on; or according to the operation of the user on the operating interface, firstly a template identification input by the user is obtained, and then the template information corresponding to the template identification stored in the first terminal in advance is obtained. The template information obtained according to the template identification input by the user may meet the display requirements in various scenarios.

In another optional embodiment, the template information may also be generated according to the user input, and then self-defined by the user.

In another optional embodiment, the template information may also be stored in the server in advance and obtained by the server though requested by the first terminal.

The specific determination means of the template information are not limited in the embodiment.

In the embodiment, step S23 may specifically include the following steps: firstly, according to the visitor information, the template content is determined corresponding to the template field; then according to the template field, the format information and the template content, the card information is generated.

In a specific implementation, the card information generated according to the template field, the format information and the template content may be displayed in the preview interface of the first terminal as shown in FIG. 4, the card information to be displayed may include the template field, and the template content displayed according to the format information of the template field, etc.

Wherein, the step of according to the visitor information, the template content is determined corresponding to the template field specifically includes: acquiring a user input; determining target visitor information from the visitor information according to the user input, the target visitor information includes attribute content of at least one visitor attribute of a target visitor; and determining the template content corresponding to the template field according to the attribute content of the visitor attribute corresponding to the template field in the target visitor information.

Wherein, when the visitor information is displayed on the operating interface in a tabular form, as shown in FIG. 4, the visitor attributes may include From Type, Visitor Name, Card Type and Visitor photo url and so on, which are corresponding to the column fields in the table, respectively. Each row in the table represents the information of one visitor, including the attribute content corresponding to each column field.

In a specific implementation, when the visitor information is displayed on the operating interface in a tabular form, as shown in FIG. 4, the information of one visitor may be determined as the target visitor information by clicking the information of a certain visitor by the user. Then, the visitor attribute according to the target visitor information are matched with the template fields in the template information one by one. If the matching succeeds, the attribute content of the matching visitor attribute is determined as the template content corresponding to the template field, or the template content corresponding to the template field is further determined according to the attribute content.

Figure 5:
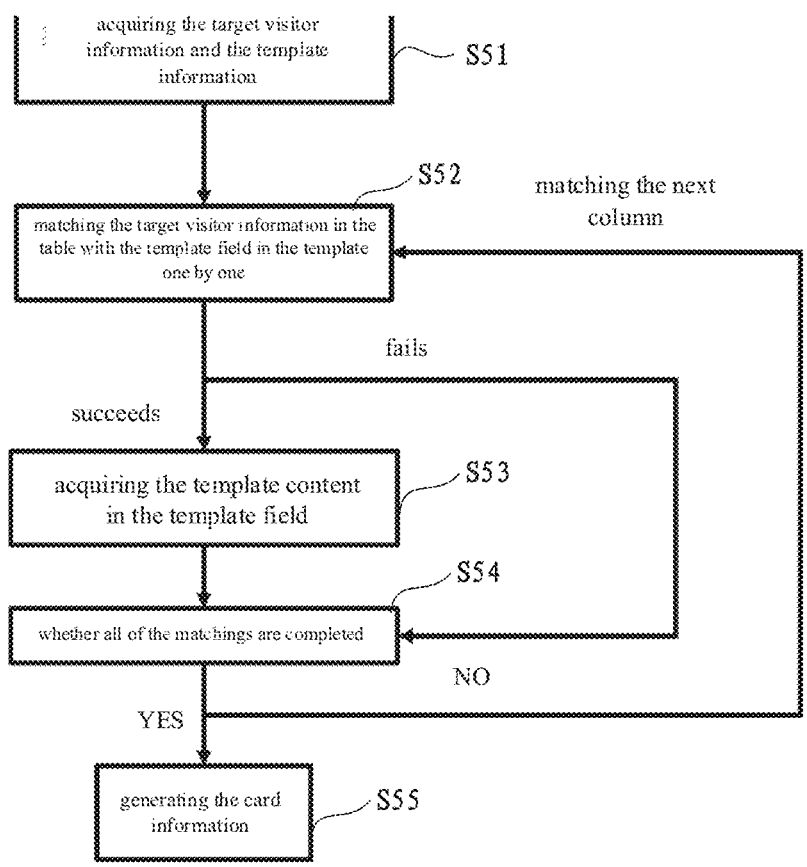
FIG. 5 shows a flow schematic chart in which the target visitor information is matched with the template information provided by the embodiments of the present disclosure.

In a specific implementation, the target visitor information in the table may be matched with the template field in the template one by one. Referring to FIG. 5, it shows a flow schematic chart in which the target visitor information is matched with the template information. Specifically, the following steps may be included:

step S51: acquiring the target visitor information and the template information.

Step S52: matching the target visitor information in the table with the template field in the template one by one. In other words, the visitor attributes in the target visitor information are matched with the template fields in the template information one by one. If the matching succeeds, then executing step S53, if the matching fails, then executing step S54.

Step S53: acquiring the template content in the template field; that is, determining the attribute content of the visitor attribute corresponding to the template field as the template content corresponding to the template field.

Step S54: determining whether all of the matchings are completed; if yes, executing step S55; if no, executing step S52, matching the next column.

Step S55: generating the card information.

Figure 6:
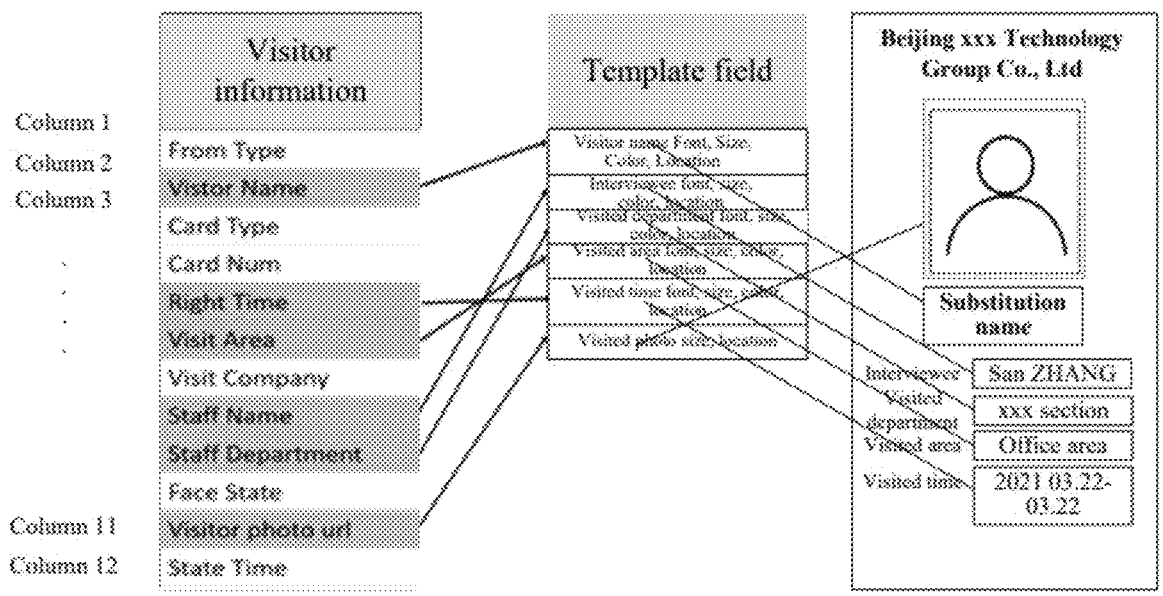
FIG. 6 shows a schematic diagram in which the target visitor information is matched with the template information provided by the embodiments of the present disclosure.

Referring to FIG. 6, the specific process of matching the target visitor information in the table with the template field in the template one by one is as follows:

column 1: a visitor attribute 'From Type', if there are no matched template fields in the template information, continuing the next column;

column 2: a visitor attribute 'Visitor Name', matched with the template field 'Visitor Name' in the template information. The 'substitute name' in the template information may be replaced by the attribute content of the target visitor corresponding to the column field Visitor Name, to obtain the template content corresponding to the template field 'Visitor Name', as the 'substitute name 9' shown in FIG. 4, the 'substitute name 9' may be displayed in the preview interface according to the format information corresponding to the template field 'Visitor Name'. That is, the 'substitute name 9' inherits the format information, such as font, size, color and location and so on, of the 'substitute name' in the template.

column 3: a visitor attribute 'Card Type', if there are no matched template fields in the template information, continuing the next column;

. . .

column 11: a visitor attribute 'Visitor photo url', matched with the visitor photo field in the template information, the first terminal obtains the network address of the photo information of the visitor 'substitute name 9' on the server from the target visitor information, then accesses the network address on the server to obtain the template content corresponding to the visitor photo field, that is, the photo information of the visitor 'substitute name 9';

column 12: a visitor attribute 'State Time', there are no matched template fields in the template information, then complete traversal and end.

In a specific implementation, when the template field includes the visitor photo field, the attribute content of the visitor attribute corresponding to the visitor photo field in the target visitor information is the network address of the target visitor photo information on the server, according to the attribute content of the visitor attribute corresponding to the template field in the target visitor information, the step of determining the template content corresponding to the template field may include: according to the network address, acquiring the target visitor photo information from the server, and determining the template content including the target visitor photo information.

The first terminal first obtains the network address of the target visitor photo information on the server from the target visitor information, and then accesses the network address on the server to obtain the template content corresponding to the visitor photo field, namely the target visitor photo information.

After obtaining the target visitor photo information, the step of generating the card information according to the template field, the format information and the template content may specifically include: processing the target visitor photo information according to the format information corresponding to the visitor photo field to obtain image information to be displayed, and to generate the card information including the image information to be displayed.

Wherein the step of processing the target visitor photo information includes at least one of the following steps: adjusting a size of the target visitor photo information; and halftone processing the target visitor photo information.

Specifically, a display module of electronic card generally uses an electronic paper, namely the electronic ink screen, and halftone processing is one of the necessary technologies for the electronic paper image display, which refers to quantizing a continuous tone image (such as a gray image and a color image) into a binary image or a color image with only a few colors with a small amount of colors. The visual effect of the quantized image is similar to that of the original image at a certain distance.

Specifically, the photo information of the target visitor 'substitute name 9' obtained by the first terminal is 102×126 pixels, which may be first adjusted to 124×153 pixels according to the format information, and then converted into black, white and red images by halftone processing. Finally, the 'photo' in the template shown in FIG. 4 is replaced, and the position of the 'photo' in the template is inherited, so that the photos after halftone processing may be better displayed in the electronic card. At the same time, the electronic card itself is not required to process the photos, or it is avoided that the electronic card may not better display the photos without halftone processing due to being not capable of processing the photos.

In the embodiment, the first terminal acquires the visitor information from the server, the visitor information is displayed on the operating interface of the first terminal in the form of a table, users only need to click to select the corresponding visitor and may automatically match and update the template field in the template information to obtain the template content, and then generate the card information, and send the card information to the electronic card. By refreshing the electronic card, it may easily complete the content update of the electronic card.

An information management method provided by an embodiment of the present disclosure, applied to a server in the information management system (as shown in FIG. 1).

Figure 7:
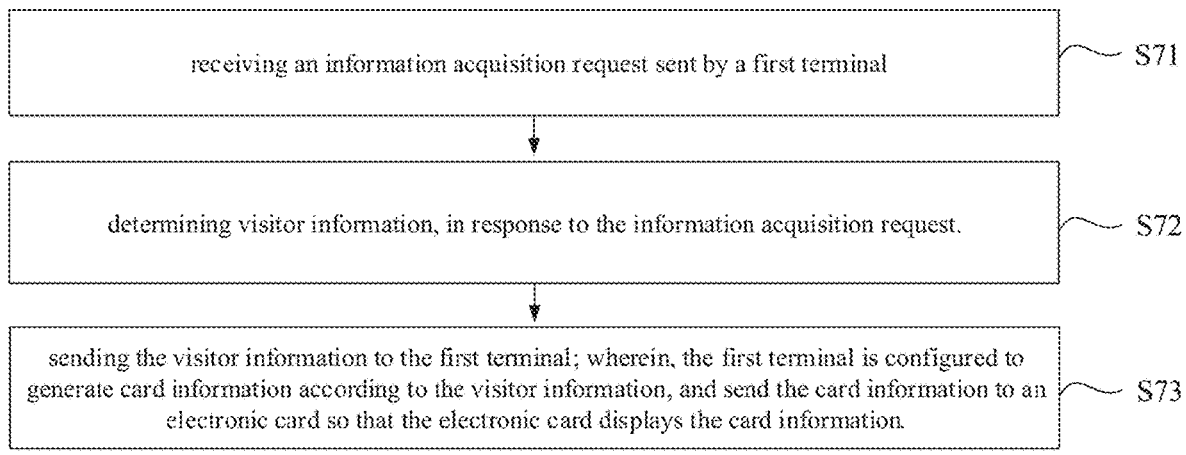
FIG. 7 shows a step flow chart of an information management method provided by the embodiments of the present disclosure.

Referring to FIG. 7, the information management method includes:

step S71: receiving an information acquisition request sent by a first terminal.

Wherein, the information acquisition request may include a quantity identification, the quantity identification is configured to indicate a quantity of the visitor information request acquired by the first terminal.

Step S72: determining visitor information, in response to the information acquisition request.

In the embodiment, the visitor information may be stored in a database of the server in advance.

When the information acquisition request includes a quantity identification, the step may include: determining the visitor information according to the quantity of the visitor information indicated by the quantity identification.

Step S73: sending the visitor information to the first terminal; wherein, the first terminal is configured to generate card information according to the visitor information, and send the card information to an electronic card so that the electronic card displays the card information.

The process that the server sends the visitor information to the first terminal and the first terminal generates the card information according to the visitor information may be referred to the description of the embodiment shown in FIG. 2, which is not repeated here.

The information management method provided by the embodiment, the server responds to the information acquisition request of the first terminal, to determine the visitor information, and sends the visitor information to the first terminal, so that the first terminal may generate the card information according to the visitor information and send the card information to the electronic card, so as to realize the refresh of the display content of the electronic card. The embodiment may conveniently manage and replace the card information on the electronic card, avoiding the trouble of inputting the visitor information (such as scene photographing, inputting personal information, etc.) on the scene in the related art.

In an optional embodiment, as shown in FIG. 1, the information management system further includes a second terminal 14. The second terminal 14 is configured for acquiring identification information of a visitor and scene photo information obtained by a scene photographing of the visitor, the identification information includes identification identity information and identification photo information; sending an authentication request to the server, the authentication request includes the identification information of the visitor and the scene photo information.

In the embodiment, the second terminal 14 may be an intelligent phone, a panel computer, or other intelligent device, which is not limited in the embodiment.

In a specific implementation, the first terminal 12 and the second terminal 14 may be the same, which is not limited in the embodiment.

In an optional embodiment, the first terminal 12 and the second terminal 14 may be the same device, which is not limited in the embodiment.

In the embodiment, before the step S72, the server may execute the following steps:
    receiving an authentication request sent by a second terminal, the authentication request includes identification information of a visitor and scene photo information obtained by a scene photographing the visitor, wherein the identification information includes identification identity information and identification photo information;
    determining reserved access information of the visitor;
    if the reserved access information is matched with the identification identity information, and the identification photo information is matched with a face recognition result of the scene photo information, and then an authentication status of the visitor is determined to be authenticated, the visitor information includes information of the authenticated visitor, the visitor information includes at least one of the following: identification identity information, identification photo information, reserved access information and scene photo information; and storing the visitor information.

In a specific implementation, before the step of determining the reserved access information of the visitor, the method further includes:

receiving an information filling request sent by a third terminal, the information filling request includes a visitor identification and an information template;

sending the information template to a visitor terminal indicated by the visitor identification; wherein the visitor terminal is configured to receive and display the information template, obtain editing operation of the visitor for the information template, obtain the reserved access information of the visitor according to the editing operation, and send the reserved access information to the server; and receiving and storing the reserved access information.

In the embodiment, the interviewee may send the information filling request on the third terminal through small programs and so on. The information filling request may include the visitor identification and the information template. Wherein the visitor identification, for example, may be determined by a receiving object of the information template selected by the interviewee. The information template may include the visitor names, telephones, visit reasons, visit time and so on.

The server sends the information template to the visitor terminal corresponding to the visitor identification, according to the visitor identification.

After the visitor terminal receives the information template, it displays the information template on the visitor terminal interface, and obtains the editing operation of the visitor for the information template. According to the editing operation, the reserved access information is obtained, and the reserved access information is sent to the server, so that the server receives and stores the reserved access information.

Wherein, the information template may be sent to the visitor terminal in the form of links, and the visitor click the links, so that the information template is displayed on the visitor terminal interface. On this interface, visitors may further complete personal information (such as ID number, etc.), so as to complete the advance entry of the reserved access information. The reserved access information may be the identity information input in advance by the visitors and/or the interviewee.

After the visitor arrives, the identity card may be brushed on the visitor self-service machine (i.e., the second terminal) in the reception room. The visitor self-service machine obtains the visitor identification identity information such as names and identity card numbers and as well as the identification photo information from the chip in the identity card, and takes a scene photographing of the visitor, to obtain the scene photo information of the visitor, then the identification photo information, the identification identity information and the scene photo information are sent to the server.

After that, the server may compare the identification identity information with the names and the identity card numbers in the reserved access information, and compare the identification photo information with the scene photo information for face recognition.

Photo information of the identification with the photo information of the scene After the two are matched, the server may change the visitor information to be a state of being 'authenticated', which may be request acquired by the first terminal.

Wherein, the identification photo information may be configured to generate the card information, and the scene photo information may be configured to grant the temporary permission of the face recognition gate.

In the embodiment, the server may store the visitor information in advance, and through the double comparison of the identification information with the reserved access information and the scene photo information, the verification of the visitor is completed, to improve the visiting security, and to improve the accuracy of the visitor information.

An information management device applied to a first terminal provided by an embodiment of the present disclosure, wherein, including a processor and a memory coupled with the processor, the memory stores a computer instruction, when the computer instruction is executed by the processor, the device executes the method according to any one of the embodiments.

With regard to the devices in the above embodiments, wherein the specific manners in which the processor executes the computer instruction is described in detail in the embodiment of the method, and which may be not described in detail here.

An information management device applied to a server provided by an embodiment of the present disclosure, wherein, including a processor and a memory coupled with the processor, the memory stores a computer instruction, when the computer instruction is executed by the processor, the device executes the method according to any one of the embodiments.

With regard to the devices in the above embodiments, wherein the specific manners in which the processor executes the computer instruction is described in detail in the embodiment of the method, and which may be not described in detail here.

An information management system provided by an embodiment of the present disclosure, as shown in FIG. 1, including a first terminal 12, a server 11 and an electronic card 13;

the first terminal 12 is configured for, sending an information acquisition request to the server 11; receiving the visitor information sent by the server 11; generating card information according to the visitor information; and sending the card information to the electronic card 13;

the server 11 is configured for, receiving the information acquisition request sent by the first terminal 12; determining visitor information, in response to the information acquisition request; and sending the visitor information to the first terminal 12; and the electronic card 13 is configured for, receiving the card information sent by the first terminal 12 and displaying the card information.

In an optional embodiment, the information management system further includes:

a second terminal 14 is configured for, acquiring identification information of a visitor and scene photo information obtained by a scene photographing of the visitor, the identification information includes identification identity information and identification photo information; sending an authentication request to the server 11, the authentication request includes the identification information of the visitor and the scene photo information;

the server 11 is further configured for, receiving the authentication request sent by the second terminal 14; determining reserved access information of the visitor; if the reserved access information is matched with the identification identity information, and the identification photo information is matched with a face recognition result of the scene photo information, and then an authentication status of the visitor is determined to be authenticated, the visitor information includes information of the visitor whose authentication status is authenticated, the visitor information includes at least one of the following: identification identity information, storing the visitor information.

The information management system provided by the embodiment, the first terminal sends the information acquisition request to the server, the server responds to the information acquisition request of the first terminal, to determine the visitor information, and sends the visitor information to the first terminal, so that the first terminal generates the card information according to the visitor information and sends the card information to the electronic card, the electronic card refresh the card information. The embodiment may conveniently manage and replace the card information on the electronic card, avoiding the trouble of inputting scene visitor information (such as on-site photography, inputting personal information, etc.) in the related art.

In the embodiment, the second terminal 14 may be an intelligent phone, a panel computer, or other intelligent device, which is not limited in the embodiment.

In a specific implementation, the first terminal 12 and the second terminal 14 may be the same, which is not limited in the embodiment.

In an optional embodiment, the first terminal 12 and the second terminal 14 may be the same device, which is not limited in the embodiment.

In an optional embodiment, as shown in FIG. 1, the information management system may also include:

a card reader 15, the card reader 15 is connected with the first terminal 12 and is configured for receiving the card information sent by the first terminal 12, and sending the card information to the electronic card 13 through near-field communication.

Wherein, the near-field communication may be Bluetooth communication, WIFI communication or NFC communication and other wireless communication.

When communicating through NFC, the function of the card reader 15 is to receive the card information sent by the first terminal 12, and convert the card information to a 13.56 MHz NFC signal and send it to the electronic card 13.

Figure 8:
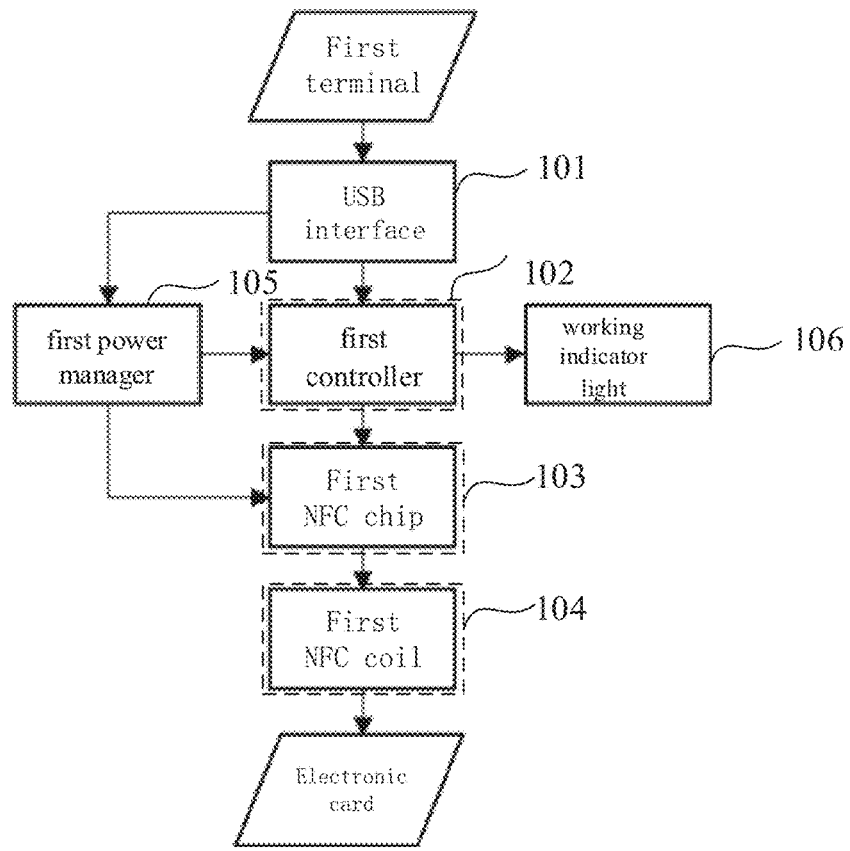
FIG. 8 shows a structure schematic diagram of a card reader provided by the embodiments of the present disclosure.

Referring to FIG. 8, which shows a structure schematic diagram of a card reader. The card reader is connected with the first terminal 12 through a universal serial bus interface (that is a USB interface) 101, and the card reader includes a first controller 102, a first near-field communication coil 104, a first near-field communication chip 103 and a first power manager 105.

Wherein, the first controller 102 connects with the universal serial bus interface 101, the first power manager 105 and the first near-field communication chip 103, respectively, and the first controller 102 is configured for controlling the reader to receive the card information sent by the first terminal 12 through the universal serial bus interface 101, and sending the card information to the electronic card 13 through the first near-field communication coil 104 and the first near-field communication chip 103; and the first power manager 105 further connects with the universal serial bus interface 101 and the first near-field communication chip 103, respectively, and the first power manager 105 is configured for supplying power to the first controller 102 and the first near-field communication chip 103 according to an output of the universal serial bus interface 101.

In a specific implementation, the card reader may also include: a working indicator light 106 connected with the first controller 102. The working indicator light 106 is configured to indicate the working state of the card reader 15.

Referring to FIG. 8, for example, the first controller 102 may include a first processor and so on, which is not limited in the embodiment.

The first near-field communication coil 104, for example, the first near-filed communication coil 104 may include a first NFC antenna coil, which is not limited in the embodiment.

The first near-field communication chip 103 has near-field communication function, for example, it may include a first NFC chip, which is not limited in the embodiment.

The first power manager 105 may include batteries and field effect transistors, etc. which is not limited in the embodiment.

In an optional embodiment, the second terminal 12 may be a mobile terminal with near-field communication function, for example the second terminal 12 may be a mobile phone with NFC function and so on.

Wherein, the near-field communication may be Bluetooth communication, WIFI communication or NFC communication and other wireless communication.

In the embodiment, since the first terminal 12 is a mobile terminal with near-field communication function, it may directly perform the near-field communication with electronic card 13, which may simplify the structure of the information management system and improve information transmission.

Figure 9:
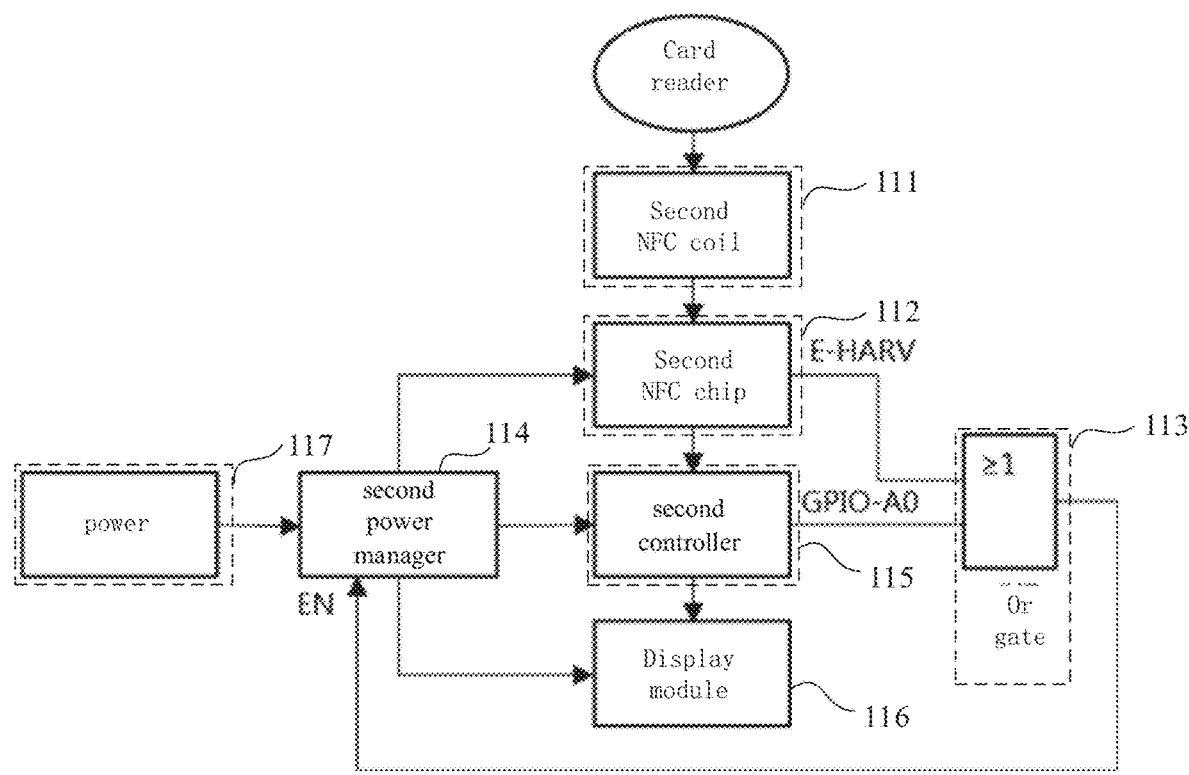
FIG. 9 shows a structure schematic diagram of an electronic card provided by the embodiments of the present disclosure.

In an optional embodiment, referring to FIG. 9, which shows a structure schematic diagram of an electronic card, the electronic card 13 may include a second near-field communication coil 111, a second near-field communication chip 112, a selector 113, a second power manager 114, a second controller 115 and a display module 116.

Wherein the second near-field communication coil 111 is configured for detecting a magnetic field signal.

The second near-field communication chip 112 connects with the second near-field communication coil 111 and the selector 113, respectively, and the second near-filed communication chip 112 is configured for converting the magnetic field signal detected by the second near-field communication coil 111 into an electrical signal when the magnetic field signal is detected by the second near-field communication coil 111, and outputting the electrical signal to the selector 113.

The selector 113 further connects with the second controller 115 and the second power manager 114, and the selector 113 is configured for outputting an enabling signal to the second power manager 114 according to the electrical signal and a working signal of the second controller 115.

The second power manager 114 further connects with a power 117, the second controller 115 and the display module 116, respectively, and the second power manager 114 is configured to turn on or turn off the connection between the power 117 and the second controller 115 and the display module 116 according to the enabling signal.

The second controller 115 is configured for controlling the electronic card 13 to receive the card information and refreshing the display module 116 when the connection between the second controller 115 and the power 117 is turned on; the display module 116 is configured for displaying the card information.

Referring to the FIG. 9, the second near-field communication coil 111, for example, may include a second NFC antenna coil, which is not limited in the embodiment.

The second near-field communication chip 112 is provided with a near-field communication function, for example, it may include a second NFC chip, which is not limited in the embodiment.

The selector 113, for example, it may include or gate logic circuits and so on, which is not limited in the embodiment.

The second power manager 114 may include batteries and field effect transistors, and so on, which is not limited in the embodiment.

The second controller 115, for example, it may include a second processor and so on, which is not limited in the embodiment.

The display module 116, for example, it may include an electronic ink screen, which is not limited in the embodiment. The electronic ink screen uses electrophoresis display technology, the power of the electronic ink screen is only consumed during the refresh, and may still be displayed normally after the refresh is completed. In this way, the electronic card 13 may connect the power in the process of the information transmission and the refresh display. After the refresh display is completed, the power may be cut off, and the card information may be displayed on standby.

The power 117, for example, may include batteries, which is not limited in the embodiment.

The electronic card provided by the embodiment may save power consumption and prolong the service life of the battery. It has the advantages of low power consumption, long service life and refreshable. Compared with the traditional general visitor card without any visitor information, the electronic paper visitor card may display rich visitor information and facilitate the unified management of visitors.

In practical applications, when the apparatus with near-field communication function such as the first terminal 12 or the card reader is located in the effective distance range of the second near-field communication coil 111, the second near-field communication coil 111 may detect the magnetic field signal, and the magnetic field signal is sent to the second near-field communication chip 112, so that the second near-field communication chip 112 converts the magnetic field signal into the electrical signal.

In a specific implementation, the enabling signal EN of the second power manager 114 may be controlled to connect the power 117 with the second controller 115 and the display module 116 at a high-level, respectively. When the card reader (or other near-field communication apparatus) is close near the electronic card 13, the second near-field communication chip 112 collects electricity through the second near-field communication coil 111 to generate a high-level electrical signal E-HARV. The electrical signal E-HARV passes through the or gate and outputs a high-level enabling signal EN. Therefore, it may connect the power 117 with the second controller 115, the second controller 115 starts working to generate a high-level working signal GPIO-A0. When the communication between the electronic card 13 and the card reader is completed and the card reader is removed, the electrical signal E-HARV output by the second near-field communication chip 112 is at a low-level. Since the working signal GPIO-A0 of the second controller 115 is still at a high-level and passes through the or gate, so that the enabling signal EN is still at a high-level. After the display update of the second controller 115 is completed, the working signal GPIO-A0 is converted into a low-level and passes through the or gate, so that the enabling signal EN is at a low-level. The connection between the power 117 and the second controller 115 and the display module 116 is cut off.

The electronic card 13 in the embodiment, the electrical signal output through the second near-field communication chip 112 and the enabling signal EN of the second power management 114 jointly controlled by the working signal of the second controller 115 through the or gate, to make the card reader and other near-field communication apparatus connect with the power when they are close. After the data transmission is completed, the electronic card 13 may be removed. The working signal of the second controller 115 controls the power to remain on-state. After the display module is refreshed, the second controller 115 controls the power to be cut off, realizing the standby display of the electronic card 13 under the condition of no communication and no refresh, and realizing ultra-low power consumption.

An electronic apparatus provided by an embodiment of the present disclosure, the electronic apparatus includes:
a processor;
a memory configured to store processor executable instructions;
wherein, the processor is configured to execute instructions, to achieve the method described in any one of the embodiments.

Figure 10:
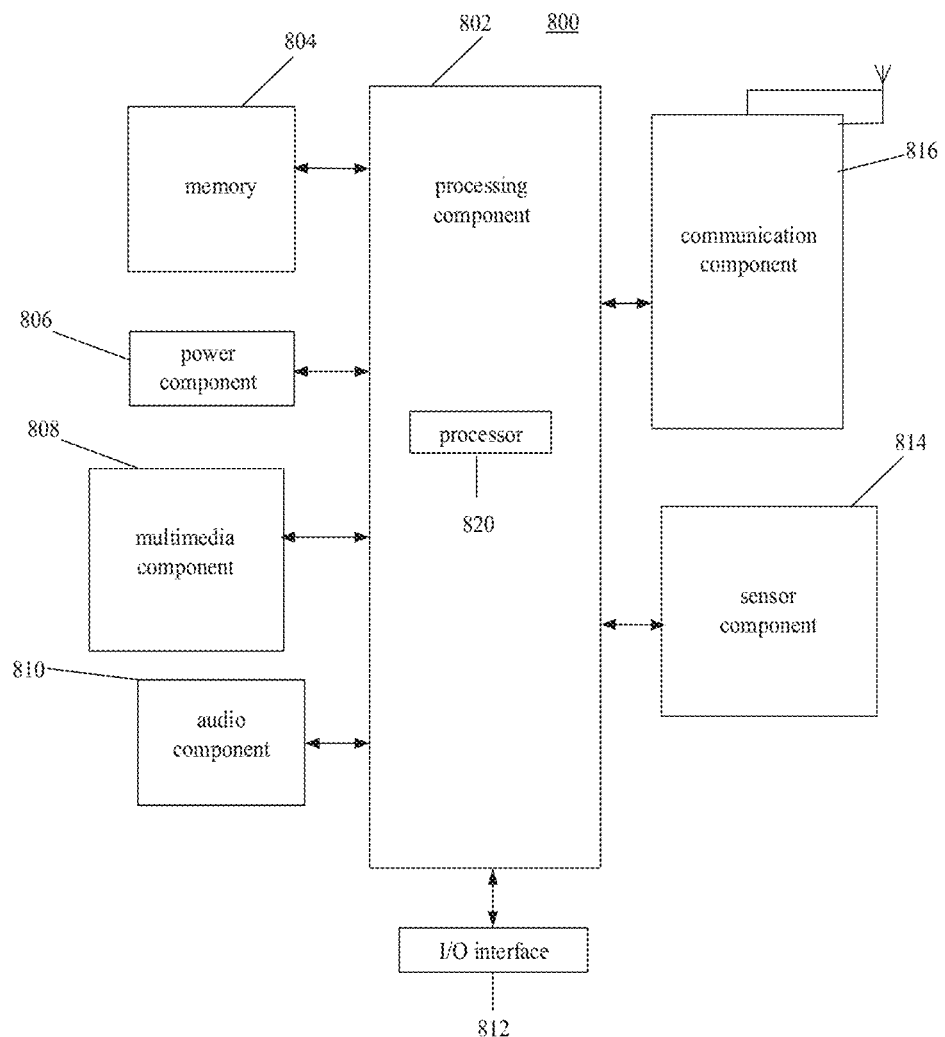
FIG. 10 shows a block diagram of an electronic apparatus provided by the embodiments of the present disclosure.

FIG. 10 is a block diagram of an electronic apparatus 800 according to the present disclosure.

For example, the electronic apparatus 800 may be mobile phones, computers, digital broadcast terminals, message receiving and sending devices, game consoles, tablet apparatuses, medical apparatuses, fitness apparatuses, personal digital assistants, etc.

Referring to FIG. 10, the electronic apparatus 800 may include the following one or more components: a processing component 802, a memory 804, a power component 806, a multimedia component 808, an audio component 810, an input/output (I/O) interface 812, a sensor component 814 and a communication component 816.

The processing component 802 usually controls the overall operations of the electronic apparatus 800, such as those operations associated with display, telephone calls, data communications, camera operations and record operations. The processing component 802 may include one or more processors 820 to execute instructions to complete all or part of the steps of the method described in any embodiment. The processing component 802 may include one or more modules to facilitate the interaction between the processing component 802 and other components. For example, the processing component 802 may include a multimedia module to facilitate interaction between the multimedia component 808 and the processing component 802.

Memory 804 is configured to store various data to support the operation on the electronic apparatus 800. Examples of these data include instructions, contacts data, phone book data, messages, pictures, videos, etc. for any application or method used to operate on an electronic device 800. Memory 804 may be realized by any type of vulnerable or non-volatile memory apparatus or their combination, such as static random access memory (SRAM), erasable programmable read-only memory (EPROM), programmable read-only memory (PROM), read-only memory (ROM), magnetic memory, flash memory, disk or optical disk.

The power component 806 provides power for various components of the electronic apparatus 800. The power component 806 may include a power management system, power and other components associated with generating, managing and distributing power for the electronic apparatus 800.

The multimedia component 808 includes a screen providing an output interface between the electronic apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, sliding, and gestures on the touch panel. The touch sensor may not only sense the boundary of the touch or sliding action, but also detect the duration and pressure associated with the touch or sliding operation. In some embodiments, the multimedia component 808 includes a front camera and/or a rear camera. When the electronic apparatus 800 is in operation modes, such as a shooting mode or a video mode, the front camera and/or the rear camera may receive external multimedia data. Each front camera and rear camera may be a fixed optical lens system or have focal length and optical zoom ability.

The audio component 810 is configured to output and/or input audio signals. For example, the audio component 810 includes a microphone (MIC). When the electronic apparatus 800 is in operation modes, such as a call mode, a record mode and a voice recognition mode, the microphone is configured to receive external audio signals. The received audio signals may be further stored in the memory 804 or sent via the communication component 816. In some embodiments, the audio component 810 also includes a speaker for outputting audio signals.

The I/O interface 812 provides interface between the processing component 802 and a peripheral interface module. The peripheral interface module may be a keyboard, a click wheel or a button. These buttons may include but not limited to: a home button, a volume button, a start button and a lock button.

The sensor component 814 includes one or more sensors used to provide state assessments of various aspects for the electronic apparatus 800. For example, the sensor component 814 may detect the opening/closing state of the electronic apparatus 800, the relative positioning of the components. For example, the components are a monitor and a small keyboard of the electronic apparatus 800. The sensor component 814 may also detect the position change of the electronic apparatus 800 or one component of the electronic apparatus 800. The contact between the user and the electronic apparatus 800 exists or does not exist, the azimuth of the electronic apparatus 800 acceleration or deceleration and the temperature change of the electronic apparatus 800. The sensor component 814 may include proximity sensors, which are configured to detect the presence of nearby objects without any physical contact. The sensor component 814 may also include optical sensors such as CMOS or CCD image sensors for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the electronic apparatus 800 and other apparatuses. The electronic apparatus 800 may access wireless networks based on communication standards, such as WIFI, operator networks (such as 2G, 3G, 4G or 5G) or their combination. In an example embodiment, the communication component 816 receives broadcast signals or broadcast-related information from an external broadcast management system via a broadcast channel. In an example embodiment, the communication component 816 also includes a near-field communication (NFC) module to promote short-range communication. For example, in the NFC module, it may be realized based on radio frequency identification (RFID) technology, infrared data association (IrDA) technology, ultra-wideband (UWB) technology, Bluetooth (BT) technology and other technologies.

In an example embodiment, the electronic apparatus 800 may be implemented by one or more application-specific integrated circuits (ASIC), digital signal processors (DSP), digital signal processing devices (DSPD), programmable logic devices (PLD), field programmable gate arrays (FPGA), second controllers, micro-second controllers, micro-processors or other electronic components configured to execute for the method in any embodiment.

A non-transient computer readable storage medium provided by an embodiment of the present disclosure, wherein, when instructions in the non-transient computer readable storage medium are executed by a processor of an electronic apparatus, electronic apparatus is capable of executing the method according to any embodiment.

In an example embodiment, a non-transient computer readable storage medium including instructions is also provided, such as the memory 804 including instructions. The above instructions may be executed by the processor 820 of the electronic apparatus 800 to complete the method described in any embodiment. For example, the non-transient computer readable storage medium may be ROM, random access memory (RAM), CD-ROM, tape, floppy disk and optical data storage apparatus and so on.

In an example embodiment, a computer program product is also provided, which includes a readable program code which may be executed by the processor 820 of the electronic apparatus 800 to complete the method described in any embodiment. Optionally, the program code may be stored in the storage medium of the electronic apparatus 800. The non-transient computer readable storage medium may be ROM, random access memory (RAM), CD-ROM, tape, floppy disk and optical data storage apparatus and so on.

Figure 11:
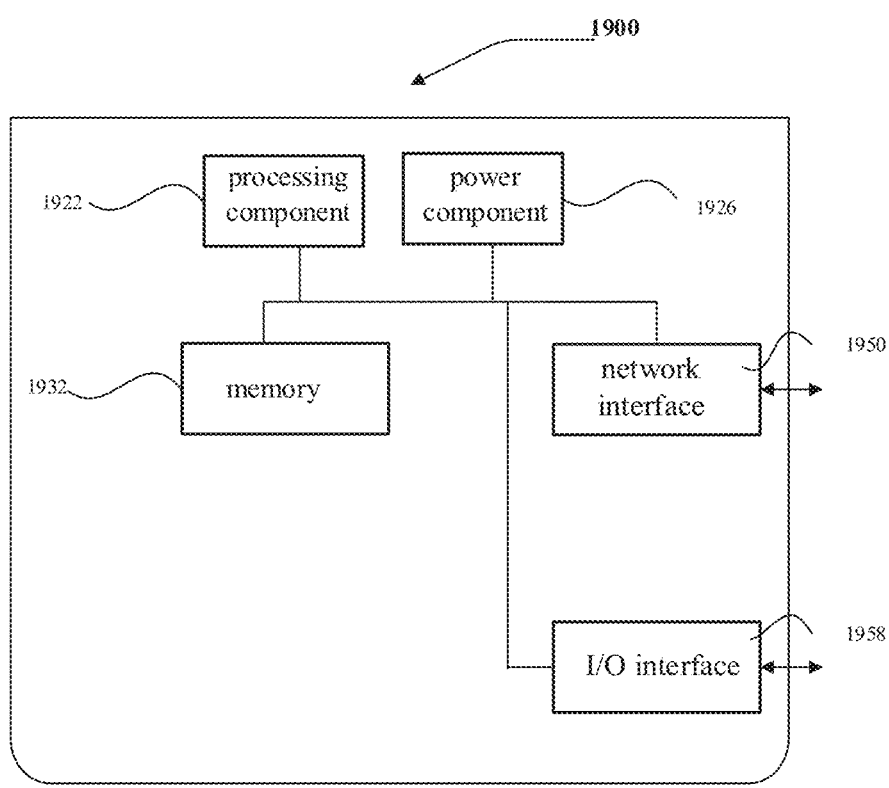
FIG. 11 shows a block diagram of an electronic apparatus provided by the embodiments of the present disclosure.

FIG. 11 is a block diagram of an electronic apparatus 1900 shown in the present disclosure. For example, the electronic apparatus 1900 may be provided as a server.

Referring to FIG. 11, the electronic apparatus 1900 includes a processing component 1922, which further includes one or more processors, as well as memory resources represented by a memory 1932, for storing instructions that may be executed by the processing component 1922, such as applications. The applications stored in the memory 1932 may include one or more modules corresponding to a set of instructions. In addition, the processing component 1922 is configured to execute instructions to execute the method described in any embodiment.

The electronic apparatus 1900 may also include a power component 1926 that is configured to execute the power management of the electronic apparatus 1900. A wired or wireless network interface 1950 is configured to connect the electronic apparatus 1900 to the network, and an input/output (I/O) interface 1958. The electronic apparatus 1900 may operate the operating system stored in the memory 1932, such as WindowsServer™, MacOSX™, Unix™, Linux™, FreeBSD™ or similarities.

Various embodiments in this specification are described in a progressive manner, and each embodiment focuses on the differences with other embodiments. The same or similar parts of various embodiments may be referred to each other.

Finally, it should also be noted that in this specification, relational terms such as first and second are used only to distinguish one entity or operation from another without necessarily requiring or implying any such actual relationship or order between these entities or operations. Moreover, the term 'including', 'containing' or any other variant is intended to cover non-exclusive inclusion, so that the process, method, commodity or equipment that includes a series of elements includes not only those elements, but also other elements that are not clearly listed, or also includes the inherent elements of such process, method, commodity or equipment. Without more restrictions, the limited elements by the sentence 'includes one . . . ' do not exclude that there are other same elements in the process, method, commodity or equipment that include the elements.

The above information management method, device, system and storage medium provided in the present disclosure are introduced in detail. In this paper, the principle and embodiments of the present disclosure expounded with specific examples. The above description of the embodiments is only used to help understand the method and core idea of the present disclosure. At the same time, for the general technical personnel in the art, according to the idea of the present disclosure, there may be changes in the specific implementations and application scope. In summary, the content of this specification should not be understood as the limitation of this disclosure.

After considering the specification and practicing the inventions disclosed here, a person skilled in the art may easily think of other embodiments of the present disclosure. The present disclosure aims to cover any variations, uses or adaptive changes in present disclosure. These variations, uses or adaptive changes follow the general principles of the present disclosure and include public knowledge or common technical means in this art that are not disclosed in the present disclosure. Specification and embodiments are only treated as illustrative, and the true scope and spirit of this disclosure are stated in the following claims.

It should be understood that the present disclosure is not limited to the precise structure described above and shown in the attached figure, and may be modified and changed in a variety of ways without leaving its scope. The scope of the present disclosure is limited only by the attached claims.

The term "one embodiment", "an embodiment", or "one or more embodiments" herein means that the particular features, structures, or features described in combination with embodiments are included in at least one embodiment disclosed herein. Also, note that the examples of words "in an embodiment" here do not necessarily all refer to the same embodiment.

A great deal of detail is provided in the manual provided here. However, it is understood that this disclosed embodiment may be practiced without such specific details. In some instances, known methods, structures and techniques are not detailed so as not to obscure the understanding of this specification.

In a claim, no reference symbol between parentheses shall be constructed to restrict the claim. The word "include" does not exclude the existence of elements or steps not listed in the claim. The word "one" or "one" before a component does not preclude the existence of more than one such component. This exposure may be implemented with the help of hardware including several different components and with the help of properly programmed computers. In listing the unit claims of several devices, several of these devices may be embodied by the same hardware item. The use of the words first, second, and third does not indicate any order. These words may be interpreted as names.

Finally, it should be noted that the above embodiments are only used to illustrate, and not to limit, the disclosed technical solution; notwithstanding the detailed description of this disclosure with reference to the foregoing embodiments, ordinary technical personnel in the field should understand that they may still modify the technical solutions recorded in the foregoing embodiments, or make equivalent substitutions to some of the technical features thereof; such modifications or substitutions shall not separate the essence of the corresponding technical solutions from the spirit and scope of the technical solutions of the disclosed embodiments.

The invention claimed is:

1. An information management method, wherein, the method is applied to a server, comprising:
   receiving an information acquisition request sent by a first terminal;
   determining visitor information, in response to the information acquisition request; and
   sending the visitor information to the first terminal,
   wherein, the first terminal is configured to generate card information according to the visitor information, and send the card information to an electronic card so that the electronic card displays the card information,
   wherein, before the step of determining the visitor information, the method further comprises:
      receiving an authentication request sent by a second terminal, the authentication request comprises identification information of a visitor and scene photo information obtained by a scene photographing of the visitor, wherein the identification information comprises identification identity information and identification photo information;
      determining reserved access information of the visitor;
      when the reserved access information is matched with the identification identity information, and the identification photo information is matched with a face recognition result of the scene photo information, and then an authentication status of the visitor is determined to be authenticated, the visitor information comprises information of the authenticated visitor, the visitor information comprises at least one of the following: the identification identity information, the identification photo information, the reserved access information and the scene photo information; and
      storing the visitor information, and
   wherein, before the step of determining the reserved access information of the visitor, the method further comprises:
      receiving an information filling request sent by a third terminal, the information filling request comprises a visitor identification and an information template;
      sending the information template to a visitor terminal indicated by the visitor identification; wherein the visitor terminal is configured to receive and display the information template; obtaining editing operation of the visitor for the information template; obtaining the reserved access information of the visitor according to the editing operation; and sending the reserved access information to the server;

receiving and storing the reserved access information; generating card information according to the visitor information; and displaying the card information on a display of the electronic card.

2. The information management method according to claim 1,
wherein the information acquisition request comprises a quantity identification, the quantity identification is configured to indicate a quantity of the visitor information request acquired by the first terminal, and
wherein the step of determining the visitor information, in response to the information acquisition request comprises determining the visitor information according to the quantity of the visitor information indicated by the quantity identification.

3. An information management device applied to a server, comprising a processor and a memory coupled with the processor, wherein the memory stores a computer instruction, and when the computer instruction is executed by the processor, the device executes the method according to claim 1.

4. A non-transient computer readable storage medium storing instructions that, when executed by a processor of an electronic apparatus, causes the electronic apparatus to execute the method according to claim 1.

5. The information management method according to claim 1,
wherein, before the step of generating the card information according to the visitor information, the method further comprises determining template information, the template information comprises a template field and format information corresponding to the template field, and
wherein the step of generating the card information according to the visitor information comprises:
determining template content corresponding to the template field according to the visitor information; and
generating card information according to the template field, the format information and the template content.

6. The information management method according to claim 5, wherein the step of determining the template content corresponding to the template field according to the visitor information comprises:
acquiring a user input;
determining target visitor information from the visitor information according to the user input, the target visitor information comprises attribute content of at least one visitor attribute of a target visitor; and
determining the template content corresponding to the template field according to the attribute content of the visitor attribute corresponding to the template field in the target visitor information.

7. The information management method according to claim 6,
wherein the template field comprises a visitor photo field, the attribute content of the visitor attribute corresponding to the visitor photo field in the target visitor information is a network address of target visitor photo information on the server,
wherein the step of determining the template content corresponding to the template field according to the attribute content of the visitor attribute corresponding to the template field in the target visitor information comprises:
acquiring target visitor photo information from the server according to the network address; and
determining the template content comprising the target visitor photo information, and
wherein the step of generating the card information according to the template field, the format information and the template content comprises:
processing the target visitor photo information according to the format information corresponding to the visitor photo field to obtain image information to be displayed; and
generating the card information comprising the image information to be displayed.

8. The information management method according to claim 7, wherein the step of processing the target visitor photo information comprises at least one of the following steps:
adjusting a size of the target visitor photo information; and
halftone processing the target visitor photo information.

9. The information management method according to claim 5, wherein, the step of determining the template information comprises:
acquiring a template identification input by the user; and
acquiring the template information stored in advance in the first terminal corresponding to the template identification.

10. The information management method according to claim 1, wherein the step of sending the card information to an electronic card comprises sending the card information to a card reader connected to the first terminal, so that the card reader sends the card information to the electronic card through near-field communication.

11. An information management system comprising a first terminal, a server, and an electronic card,
wherein the first terminal is configured for:
sending an information acquisition request to the server;
receiving the visitor information sent by the server;
generating card information according to the visitor information; and
sending the card information to the electronic card,
wherein the server is configured for:
receiving the information acquisition request sent by the first terminal;
determining visitor information, in response to the information acquisition request; and
sending the visitor information to the first terminal,
wherein the electronic card is configured for:
receiving the card information on a display of the electronic card sent by the first terminal and displaying the card information, the information management system further comprises a second terminal configured for acquiring identification information of a visitor and scene photo information obtained by a scene photographing of the visitor, the identification information comprises identification identity information and identification photo information, and
sending an authentication request to the server, the authentication request comprises the identification information of the visitor and the scene photo information,
wherein the server is further configured for:
receiving the authentication request sent by the second terminal, determining reserved access information of the visitor;

when the reserved access information is matched with the identification identity information and the identification photo information is matched with a face recognition result of the scene photo information, an authentication status of the visitor is determined to be authenticated, the visitor information comprises information of the visitor whose authentication status is authenticated, the visitor information comprises at least one of the identification identity information, the identification photo information, the reserved access information, and the scene photo information; and storing the visitor information, wherein before the step of determining the reserved access information of the visitor, the server is further configured for:

receiving an information filling request sent by a third terminal, the information filling request comprises a visitor identification and an information template; and sending the information template to a visitor terminal indicated by the visitor identification, the visitor terminal being configured to receive and display the information template, wherein the visitor terminal is configured for:

obtaining editing operation of the visitor for the information template;

obtaining the reserved access information of the visitor according to the editing operation; and sending the reserved access information to the server, and wherein the server is further configured for receiving and storing the reserved access information.

12. The information management system according to claim 11, wherein, the information management system further comprises a card reader that connects with the first terminal, the card reader being configured for receiving the card information sent by the first terminal, and sending the card information to the electronic card through near-field communication, the near-field communication being Bluetooth communication, WIFI communication or NFC communication.

13. The information management system according to claim 12, wherein the card reader connects with the first terminal through a universal serial bus interface, wherein the card reader comprises a first controller, a first near-field communication coil, a first near-field communication chip, and a first power manager, wherein the first controller connects with the universal serial bus interface, the first power manager and the first near-field communication chip, respectively, and the first controller is configured for controlling the reader to receive the card information sent by the first terminal through the universal serial bus interface, and sending the card information to the electronic card through the first near-field communication coil and the first near-field communication chip, and wherein the first power manager further connects with the universal serial bus interface and the first near-field communication chip, respectively, and the first power manager is configured for supplying power to the first controller and the first near-field communication chip according to an output of the universal serial bus interface.

14. The information management system according to claim 11, wherein, the first terminal is a mobile terminal with near-field communication function, and the near-field communication is Bluetooth communication, WIFI communication or NFC communication.

15. The information management system according to claim 11, wherein the electronic card comprises a second near-field communication coil, a second near-field communication chip, a selector, a second power manager, a second controller and a display module, the second near-field communication coil is configured for detecting a magnetic field signal, the second near-field communication chip connects with the second near-field communication coil and the selector, respectively, and the second near-filed communication is configured for converting the magnetic field signal detected by the second near-field communication coil into an electrical signal when the magnetic field signal is detected by the second near-field communication coil, and outputting the electrical signal to the selector, the selector further connects with the second controller and the second power manager, and the selector is configured for outputting an enabling signal to the second power manager according to the electrical signal and a working signal of the second controller, the second power manager further connects with a power, the second controller, and the display module, respectively, and the second power manager is configured to turn on or turn off the connection between the power and the second controller and the display module according to the enabling signal, and the second controller is configured for controlling the electronic card to receive the card information and refresh the display module when the connection between the second controller and the power is turned on; the display module is configured for displaying the card information.

* * * * *